United States Patent [19]

Galloway

[11] Patent Number: 4,943,202
[45] Date of Patent: Jul. 24, 1990

[54] TILTING MOBILE PLATFORM

[76] Inventor: Donald Galloway, 7605 DeSoto Hwy., Bradenton, Fla. 33529

[21] Appl. No.: 167,846

[22] Filed: Mar. 14, 1988

[51] Int. Cl.$^5$ .............................................. B60P 1/18
[52] U.S. Cl. .................................. 414/475; 280/43.23; 280/149.2; 280/789; 414/476; 414/484
[58] Field of Search .............................. 414/474–476, 414/482–485, 480; 280/43.23, 80 B, 789, 149.2

[56] References Cited

U.S. PATENT DOCUMENTS

| | | | |
|---|---|---|---|
| 2,753,064 | 7/1956 | Lesser | 414/475 |
| 2,901,138 | 8/1959 | Whalen | 414/483 |
| 3,071,267 | 1/1963 | Bunch | 414/476 |
| 3,228,546 | 1/1966 | Bunch | 414/483 |
| 3,635,492 | 1/1972 | Mauldin | 280/43.23 |
| 4,130,211 | 12/1978 | Abascal | 414/484 X |
| 4,595,210 | 1/1986 | Groeing | 414/474 X |

FOREIGN PATENT DOCUMENTS 3620328  2/1987  Fed. Rep. of Germany .... 280/80 B

*Primary Examiner*—David A. Bucci
*Attorney, Agent, or Firm*—Frijouf, Rust & Pyle

[57] ABSTRACT

A tilting mobile platform comprising a platform having an upper surface and a lower surface with a first and a second rail member securely fastened to the lower surface of the platform is disclosed. An axle supporting frame is slidably secured to the rail members. A first axle is rotatably attached to the axle supporting frame such that the axle is transversely mounted on the axle supporting frame relative to a path of movement of the axle supporting frame along the rail members. An axle supporting frame moving means moves the axle supporting frame along the first and the second rail members from a first position to a second position. The axle further includes a first and a second axle arm extending perpendicular to the axle and each axle arm further includes a stud extending substantially perpendicular relative to the axle arm and parallel to the axle. A first and a second ground engaging wheel is rotatably attached to each parallel stud for movably supporting the platform and the articles placed thereon. The platform includes a means to enable the platform to be moved along the ground. An axle rotating means rotates the axle such that in use when the axle is rotated the axle arms rotate from a first angle to a second angle and when the axle supporting frame is positioned at the second position, the platform defines a ramp position and when the axle is further rotated the axle arms form the first angle and when the axle supporting frame is positioned at the second position, the platform defines a hauling position.

28 Claims, 8 Drawing Sheets

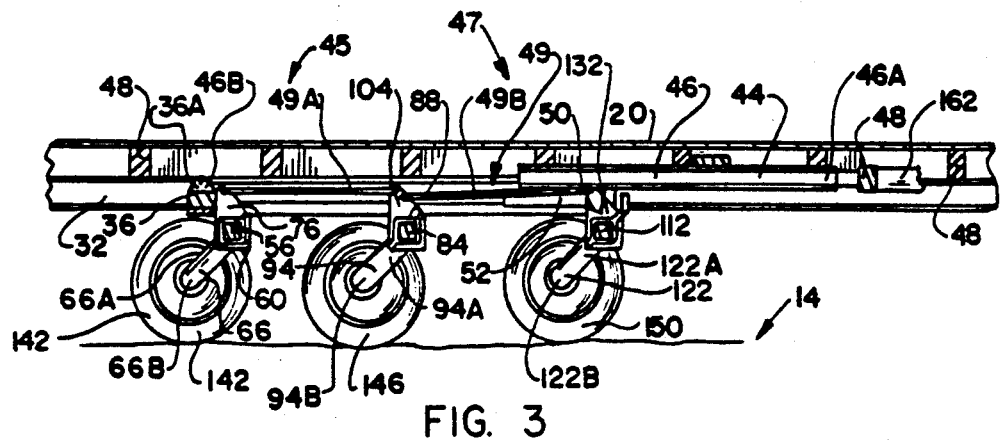
FIG. 3
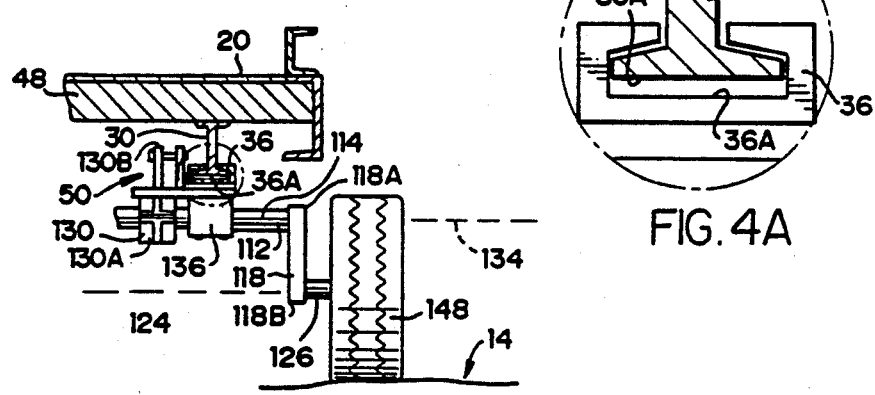
FIG. 4
FIG. 4A
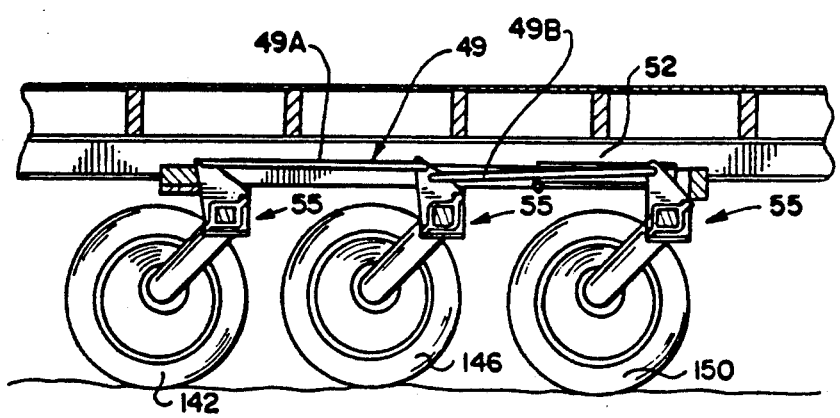
FIG. 5

TILTING MOBILE PLATFORM

BACKGROUND OF THE INVENTION

1. Field of the Invention

This invention relates to tilting mobile platform, and more specifically to a tilting mobile platform which tilts to provide a loading angle for loading and which levels for hauling equipment and the like and which is suitable for use with a towing vehicle.

2. Information Disclosure Statement

Numerous attempts have been made to remedy the problem of moving heavy equipment and the like onto a trailer or truck bed in order to transport the equipment long distances. Many of the attempts resort to an excessive and impractical tilt or loading angle. A steep loading angle is required because of the positioning of the platform over the platform supporting wheels and because of the positioning of the pivot point in tilting trailers. Extendable platforms and winches are used to overcome the problems associated with a steep loading angle. However, problems arise with respect to weight distribution and stability of the platform in moving the equipment to a hauling position on the platform.

It is a primary objective of this invention to provide an apparatus which overcomes the aforementioned difficulties of the prior art devices and provides an improvement which is a substantial contribution to the advancement in the art of loading, transporting and unloading of equipment and the like on a platform.

Another object of this invention is to provide a tilting mobile platform which tilts to about a seven degree loading angle to enable easy placement and removal of self powered equipment and the like on the platform without the need for winching the equipment into a hauling position on the platform.

Another object of this invention is to provide a tilting mobile platform which does not require extension of the length of the supporting bed in order to be placed in a loading or unloading position.

Another object of this invention is to provide a tilting mobile platform which attains a 6.5 degree (from the horizontal) ramp angle which permits direct drive on loading of low profile automobiles such as the Chevrelot IROC-Z.

Another object of this invention is to provide a tilting mobile platform which does not require a dedicated vehicle.

Another object of this invention is to provide a highly stable tilting mobile platform which includes a tow bar and may be loaded or unloaded without being attached to a towing vehicle.

Another object of this invention is to provide a highly stable tilting mobile platform which has axle contained suspension system to provide a low center of gravity.

Another object of this invention is to provide a highly stable tilting mobile platform which includes a tow bar, the loading of which is adjustable by manipulating the sliding axle undercarriage along the length of the supporting structure.

Another object of this invention is to provide a tilting mobile platform which engages the ground at an angle which allows for a self-powered vehicle and the like to be driven on the platform using only its own power and without the need for winches and the like.

Another object of this invention is to provide a tilting mobile platform which engages the ground at an angle which enables an automobile with a plastic air dam and the like to be driven onto the platform without damaging the air dam.

Another object of this invention is to provide a tilting mobile platform which tilts to define a ramp position which can be easily driven onto and off from by such vehicles as automobiles, heavy farm implements, heavy equipment and the like.

Another object of the invention is to provide a mobile tilting platform which levels to define a hauling position which is securely spaced from the ground to permit transportation of equipment placed on the platform.

Another object of the invention is to provide a mobile tilting platform which includes an alignment means for aligning the axle supporting frame thereby ensuring proper tracking of the platform when being towed by a towing vehicle and maximum tire wear.

Another object of the invention is to provide a mobile tilting platform having a rigid structure that does not require an articulating means within the structure to enable the rear portion of the platform to drop without raising the front portion.

The foregoing has outlined some of the more pertinent objects of the present invention. These objects should be construed be to be merely illustrative of some of the more prominent features and applications of the invention. Many other beneficial results can be obtained by applying the disclosed invention in a different manner or modifying the invention within the scope of the invention. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

This invention is defined by the appended claims of the specific embodiment shown in the attached drawings. For the purpose of summarizing the invention, the invention may be incorporated into an apparatus comprising a mobile tilting platform which comprises a platform for supporting and carrying articles positioned thereon. The platform includes a first end, a second end, a third end and a fourth end and has an upper surface and a lower surface. A first rail member and a second rail member are positioned between the first end and the second end of the platform with the first rail member being spaced apart relative to the second rail member in a parallel manner. Each rail member is securely fastened to the platform. An axle supporting frame having a first side and a second side is slidably secured to the first rail member and to the second rail member, respectively. This permits the axle supporting frame to move between the third end and the fourth end of the platform. A first axle with a first end and a second end is positioned on the axle supporting frame. The first end of the first axle is rotatably attached to the first side of the axle supporting frame and the second end of the first axle is rotatably attached to the second side of the axle supporting frame. This permits the axle to be transversely mounted on the axle supporting frame relative to a path of movement of the axle supporting frame along the rail members. A moving means is disclosed for moving the axle supporting frame along the first and the second rail members from a first position wherein the axle supporting frame is positioned between the third end and the fourth end of the platform to a second position wherein the axle supporting frame is positioned proximate the third end of the platform and also moving the frame from the second position wherein the axle supporting frame is positioned proximate the third end of the platform to the first position wherein the axle supporting frame is positioned between the third end and the fourth end of the platform. The axle also includes a first axle arm and a second axle arm with each axle arm having a first end and a second end. Each first end of each first and second axle arms is securely attached to each first and second ends of the axle such that each axle arm extends perpendicularly relative to an axis which extends through the axle. Secured at each second end of the first axle arm and the second axle arm is a first stud and a second stud, respectively. Each stud extends perpendicularly relative to an axis extending through the axle arm and parallel relative to the axis extending through the axle. A first and a second ground engaging wheel is rotatably attached to each of the first and the second studs respectively for movably supporting the platform and the articles placed thereon. The platform further includes a means to enable the platform to be moved along the ground. An axle rotating means rotates the axle about an axis extending from the first end to the second end of the axle. The apparatus, in use, enables the platform to define a ramp position and a hauling position. The platform defines a ramp position when the axle is rotated, thereby rotating the first and second axle arms such that the axle is proximate the ground and the axle supporting frame is positioned at the second position. The platform defines a hauling position when the axle is rotated such that the first and second axle arms are rotated such that the axle is distally positioned relative to the ground to the first location where the stud is located closer to the ground and the axle supporting frame is positioned at the first position.

Preferably, the axle rotating means for rotating the axle rotates in a first direction to obtain a proximate location of the axle relative to the ground and rotates in a direction opposite the first direction to obtain the a distal location of the axle relative to the ground.

Preferably, the means to enable the platform to be moved along the ground is a tow bar. Most preferably, the tow bar is secured proximate the third end of the platform to enable the towing of the tilting platform by a towing vehicle when hitched to the towing vehicle. However, a front wheel drive vehicle which allows the front portion of its frame to pivot on the front axle and with the rear portion of the frame comprising the tilting platform and the rear wheels of the vehicle is within the scope of the invention.

The axle rotatably mounted on the axle supporting frame includes a first and a second axle arm securably mounted at the first and second end of the axle, respectively. The axle arms are preferably positioned in the same plane to enable a level platform when in either the hauling or ramp position and to enable a level upward and downward movement across the platform when the axle is being rotated to attain either a ramp or a hauling position. Preferably, the axle is a torsion axle which provides a rubber cushioned suspension. Such axles are known in the art and are manufactured by Northland (RUB*R*RIDE), Dexter (TORFLEX) and Henchen, amoung others. Other torsion axles known in the art such as those utilizing torsion bars may also be used.

The axle rotating means and the axle supporting frame moving means are preferably hydraulic rams. However, any actuator device which results in the rotation of the axle(s) and/or which moves the axle supporting frame is within the scope of the invention.

The tilting bed may further include a second axle spaced apart from the first axle in a parallel manner relative to the first axle. The second axle includes a first end and a second end. The first end of the second axle second is rotatably attached to the first side of the axle supporting frame and the second end of the second axle is rotatably attached to the second side of the axle supporting frame. This permits the second axle to be transversely mounted on the axle supporting frame relative to a path of movement of the axle supporting frame along the rail members. The second axle also includes a first axle arm and a second axle arm with each axle having a first end and a second end. Each first end of each first and second axle arms is securely attached to each first and second ends of the second axle such that each axle arm extends perpendicularly relative to an axis extending through the second axle. Secured at each second end of the first axle arm and the second axle arm is a first stud and a second stud, respectively. Each stud extends perpendicularly relative to an axis extending through the axle arm and parallel relative to the axis extending through the second axle. A third and a fourth ground engaging wheel is rotatably attached to each of the first and the second studs of the second axle respectively for movably supporting the platform and the articles placed thereon. The axle rotating means further includes a means for rotating the second axle about an axis extending from the first end to the second end of the second axle. This permits, in use, the platform to define a ramp position when the first and second axles are rotated thereby rotating each of the first and second axle arms of each of the axles such that each of the axles is proximately positioned relative to the ground and the axle supporting frame is positioned at the second position. The platform also defines a hauling position when the first and second axles are further rotated thereby rotating each of the first and second axle arms of each of the axles such that each of the first and second axles is distally positioned relative to the ground and the axle supporting frame is positioned at the first position.

The tilting bed may further include a third axle spaced apart in a parallel manner relative to the second axle. The third axle includes a first end and a second end. The first end of the third axle is rotatably attached to the first side of the axle supporting frame; whereas, the second end of the third axle is rotatably attached to the second side of the axle supporting frame. This permits the third axle to be transversely mounted on the axle supporting frame relative to a path of movement of the axle supporting frame along the rail members. The third axle also includes a first and a second axle arm with each axle arm having a first end and a second end. The first end of each first and second axle arms is securely attached to each the first end and second end of the third axle such that each the axle arm extends perpendicularly relative to an axis extends through the third axle. Secured at each second end of the first and the second axle arms is a first and a second stud, respectively. Each stud extends perpendicularly relative to an axis extending through the axle arm and parallel relative to the axis extending through the third axle. A fifth and a sixth ground engaging wheel are rotatably attached to each of the first and the second studs of the third axle, respectively, for movably supporting the platform and the articles placed thereon. The axle rotating means further includes a means for rotating the third axle about an axis extending from the first end to the second end of the third axle. This permits, in use, the platform to define a ramp position when the first, second and third axles are rotated thereby rotating the first and second axle arms of each the axles such that each of each of the axles is proximately positioned relative to the ground and the axle supporting frame is positioned at the second position. The platform also defines a hauling position when the first, second and third axles are further rotated thereby rotating each the first and second axle arms of each of the axles such that each of the axles is distally positioned relative to the ground and the axle supporting frame is positioned at the first position.

While each axle may be provided with a means for rotating each axle independently to enable either a sequential rotation of each axle or a simultaneous rotation of each axle, preferably, the means for rotating the first axle also rotates the second axle, or any number of axles, simultaneously with the first axle. Most preferably, the axles are proportionally rotated simultaneously. In this embodiment, the axle positioned nearest the fourth end or loading end of the platform rotates to a greater extent than axles positioned further from the loading end. Preferably, the means to accomplish simultaneous and proportional rotation with the first axle is an interlinking means for rotationally interconnecting the first axle with the second axle to enable the first and the second axles to simultaneously rotate when an actuator connected to the first axle, such as an hydraulic ram, is activated. The interlinking means comprises a first strut and a second strut. The first and second struts are securely positioned proximate each first and second ends of each first and second axles with each of the first and second struts extending perpendicular relative to an axis extending through the respective axle each first and second struts are secured. Alternatively, the first and second struts may be securely positioned distally relative to each first and second ends of each first and second axles. With this configuration the struts are moved inwardly to positions equidistant from the center line of the platform. Each strut includes a first end and a second end, with the first end of each strut being distally positioned from the axle it is secured to and with the second end of each strut proximately positioned to the axle it is secured to.

The interlinking means further includes a first interlinking bar having a first end and a second end. The first end of the first interlinking bar is rotatably attached to the first strut of the first axle. The second end of the interlinking bar is rotatably attached to the first strut of the second axle, thereby interconnecting the first struts of each of the axles to provide for simultaneous rotation when one of the first and second axles is rotated. The interlinking means further includes a second interlinking bar having a first end and a second end. The first end of the second interlinking bar is rotatably attached to the second strut of the first axle. The second end of the interlinking bar is rotatably attached to the second strut of the second axle, thereby interconnecting the second struts of each of the axles to provide for simultaneous rotation when one of the first and second axles is rotated. To obtain proportional rotation of the axles, the interlinking bars must be connected to the struts such that the axle for which the greatest rotation is desired is positioned proximate the loading end of the trailer.

Preferably, the platform is positioned within the length between the first end and the second end of the axle or axles in order to permit the first and second axle arms to rotate through a plane extending horizontally from the platform.

In another embodiment of the invention, the movable tilting platform comprises a platform which includes a first end, a second end, a third end and a fourth end. The platform also includes an upper surface and a lower surface. A first rail member and a second rail member are positioned between the first end and the second end of the platform with the first rail member being spaced apart relative to the second rail member in a parallel manner. Each rail member is securely fastened, preferably, to the lower surface of the platform. An axle supporting frame having a first side and a second side is slidably secured to the first and the second rail members, respectively. This permits the axle supporting frame to slide along the rail members between the third end and the fourth end of the platform. A plurality of axles is disclosed with each axle of the plurality of axles having a first end and a second end. The first end of each axle of the plurality of axles is rotatably attached to the first side of the axle supporting frame and the second end of each axle of the plurality of axles is rotatably attached to the second side of the axle supporting frame. Each axle of the plurality of axles is spaced apart from an adjacent axle in a parallel manner and is transversely mounted on the axle supporting frame relative to a path of movement of the axle supporting frame along the rail members. A moving means moves the axle supporting frame along the first and the second rail members from a first position wherein the axle supporting frame is positioned between the third end and the fourth end of the platform to a second position wherein the axle supporting frame is positioned proximate the third end of the platform. The moving means also moves the frame from the second position wherein the axle supporting frame is positioned proximate the third end of the platform to the first position wherein the axle supporting frame is positioned between the third end and the fourth end of the platform. Each of the first and second ends of each axle of the plurality of axles further includes a first axle arm and second axle arm each having a first end and a second end. Each first end of each first and second axle arms is securely attached to each of the first and second ends respectively of each of the axles of the plurality of axles in a manner such that each of the axle arm extends perpendicularly relative to an axis extending through the respective axle. A first stud and a second stud is securely attached to each second end of each of the first and the second axle arms with each of the studs extending perpendicular relative to an axis extending through the axle arm and parallel to the axis extending through the axle. A plurality of ground engaging wheels is disclosed with each ground engaging wheel being rotatably attached to each of the first and the second studs of each axle respectively for movably supporting the platform and the articles placed thereon. The platform also includes a means to enable the platform to be moved along the ground.

An axle rotating means rotates each axle of the plurality of axles about an axis extending from the first end to the second end of each axle of the plurality of axles. The apparatus, in use, enables the platform to define a ramp position and a hauling position. The platform defines a ramp position when each axle of the plurality of axles is rotated thereby rotating the first and second axle arms of each axle of the plurality of axles such that such that each axle of the plurality of axles is proximately positioned relative to the ground and the axle supporting frame is positioned at the second position. The platform defines a hauling position when each axle of the plurality of axles is further rotated thereby rotating the first and second axle arms of each axle of the plurality of axles such that each axle of the plurality of axles is distally positioned relative to the ground and the axle supporting frame is positioned at the first position. Where an axle is a torsion axle which provides a rubber cushioned suspension, such an axle must be rotated in a direction reverse to that required to attain the loading position in order to obtain the hauling position of the platform. That is, with a torsion axle the arc of rotation is not greater that 180°. If a torsion axle is further rotated ($\pi$180°) in the same direction used to attain the hauling position, the torsioning means, e.g. rubber, may be stressed beyond its limits and destroyed.

Preferably, the axle rotating means includes a hydraulic ram.

The tilting bed includes a means for rotating each axle of the plurality of axles which includes an interlinking means for rotationally interconnecting each axle of the plurality of axles with the hydraulic ram to enable each axle of the plurality of axles to simultaneously rotate when the hydraulic ram is activated.

Perferably, the interlinking means includes a first and a second strut securely positioned proximate each first end and second end of each axle of the plurality of axles with each of the first and second struts extending substantially perpendicular relative to their respective axle of the plurality of axles. A plurality of interlinking bars with each interlinking bar having a first end and a second end which interconnects the struts. The interlinking bars interconnect each adjacent first strut positioned proximate the first end of each axle of the plurality of axles, as described above. In a like manner the interlinking bars interconnect each adjacent second strut positioned proximate the second end of each axle of the plurality of axles. The interlinking bars interconnecting each strut enables simultaneous rotation of each axle of the plurality of axles when any axle of the plurality of axles is rotated by an axle rotating means.

Another embodiment of the invention includes a front wheel drive motor vehicle having a platform. Front drives for trucks are known to those skilled in the art. The platform supports and carries articles positioned thereon and has a first end, a second end, a third end and a fourth end. A first and a second rail member is disclosed with each of the rail members positioned between the first end and the second end of the platform. The first rail member is spaced apart relative to the second rail member in a parallel manner and each of the rail members is securely fastened to the platform. Each first and second rail members have a front end and a rear end. A first front axle and a second front axle is disclosed. The first axle and the second axle are supportably positioned proximate each the front end of each of the first and second rail members respectively. A motive means is connected to each first axle and second axle to enable the platform to be moved along the ground by rotatably driving each the first front wheel and the second front wheel. An axle supporting frame has a first side and a second side with the first side being slidably secured to the first rail member and the second side being slidably secured to the second rail member such that the axle supporting frame slides between the third end and the fourth end of the platform. A first axle has a first end and a second end with the first end of the axle being rotatably attached to the first side of the axle supporting frame and the second end of the first axle being rotatably attached to the second side of the axle supporting frame such that the axle is transversely mounted on the axle supporting frame relative to a path of movement of the axle supporting frame along the rail members. An axle supporting frame moving means moves the axle supporting frame along the first and the second rail members from a first position wherein the axle supporting frame is positioned between the third end and the fourth end of the platform to a second position wherein the axle supporting frame is positioned proximate the third end of the platform and from the second position wherein the axle supporting frame is positioned proximate the third end of the platform to the first position wherein the axle supporting frame is positioned between the third end and the fourth end of the platform. A first axle arm and a second axle arm with each axle arm having a first end and a second end with the first end of each first and second axle arms securely attached to each first and second ends of the axle such that each axle arm extends perpendicularly relative to an axis extending through the axle. A first stud and a second stud is secured at each second end of the first and second axle arms such that each stud extends perpendicularly relative to an axis extending through the axle arm and parallel relative to the axis extending through the axle. A first and a second ground engaging wheel is rotatably attached to each of the first and the second studs, respectively for movably supporting the platform and the articles placed thereon. A first front and a second front ground engaging wheel is rotatably secured to each the first front axle and the second front axle for movably supporting the platform and the articles placed thereon and for enabling the front end of each of the first and second rail members to pivot about the first and second front axles thereby permitting the rear portion of each of the first and second rail members to be raised and lowered relative to the front end of each the first and the second rail members. An axle rotating means is utilized to rotate the axle about an axis extending from the first end to the second end of the axle such that in use the platform defines a ramp position when the axle is rotated thereby rotating the first and second axle arms such that the first axle is proximately positioned relative to the ground and the axle supporting frame is positioned at the second position and the platform defines a hauling position when the axle is further rotated thereby rotating the first and second axle arms such that the first axle is distally positioned relative to the ground and the axle supporting frame is positioned at the first position.

The foregoing has outlined rather broadly the more pertinent and important features of the present invention in order that the detailed description that follows may be better understood so that the present contribution to the art can be more fully appreciated. Additionally, features of the invention will be described hereinafter which form the subject of the claims of the invention. It should be appreciated by those skilled in the art that the conception and the specific embodiment disclosed may be readily utilized as a basis for modifying the preferred embodiment of the present invention by designing other devices for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention reference should be had to the following detailed description taken in conjunction with the accompanying drawings in which:

FIG. 3 is a partial view taken along line 3—3 of FIG. 2;

FIG. 4 if a partial view taken along line 4—4 of FIG. 2;

FIG. 4A is an enlarged partial view of FIG. 4;

FIG. 5 is a partial view taken along line 5—5 of FIG. 2;

Similar reference characters refer to similar parts throughout the several views of the drawings.

DETAILED DESCRIPTION

Figure 1:
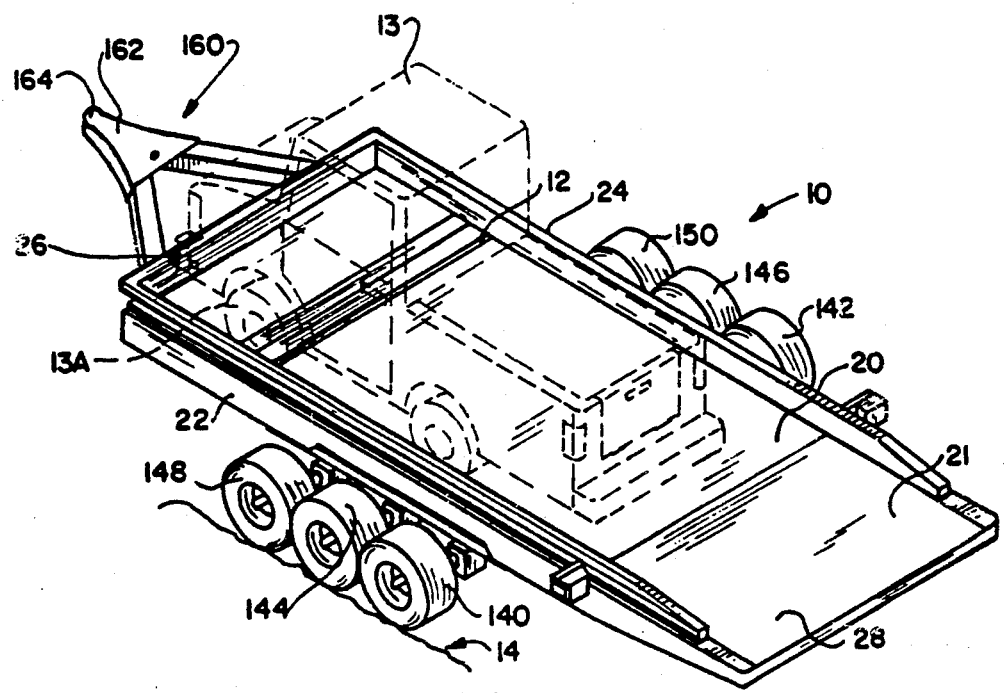
FIG. 1 is an isometric view of the mobile tilting trailer incorporating the present invention.

FIG. 1 is an isometric view of a mobile tilting trailer in the hauling position for transporting objects positioned thereon according to the present invention. The mobile tilting trailer 10 comprises a platform 20 having a first end 22, a second end 24, a third end 26 and a fourth end 28. A motor vehicle 13 illustrated in phantom lines is positioned on the top surface 21 of the platform 20. The front wheels 13A of the motor vehicle 13 are positioned in a wheel well 12 which is positioned proximate the third end 26 of the platform 20. The wheel well 12 inhibits movement of the motor vehicle 13 along the upper surface of the platform 20. A means 160 to move the trailer 10 over the ground is positioned proximate the third end 26. Preferably the means 160 to move the trailer 10 over the ground 14 is a tow bar 162. The platform is supported by a first 140, a second 142, a third 144, a fourth 146, a fifth 148 and a sixth 150 ground engaging wheel.

Figure 2:
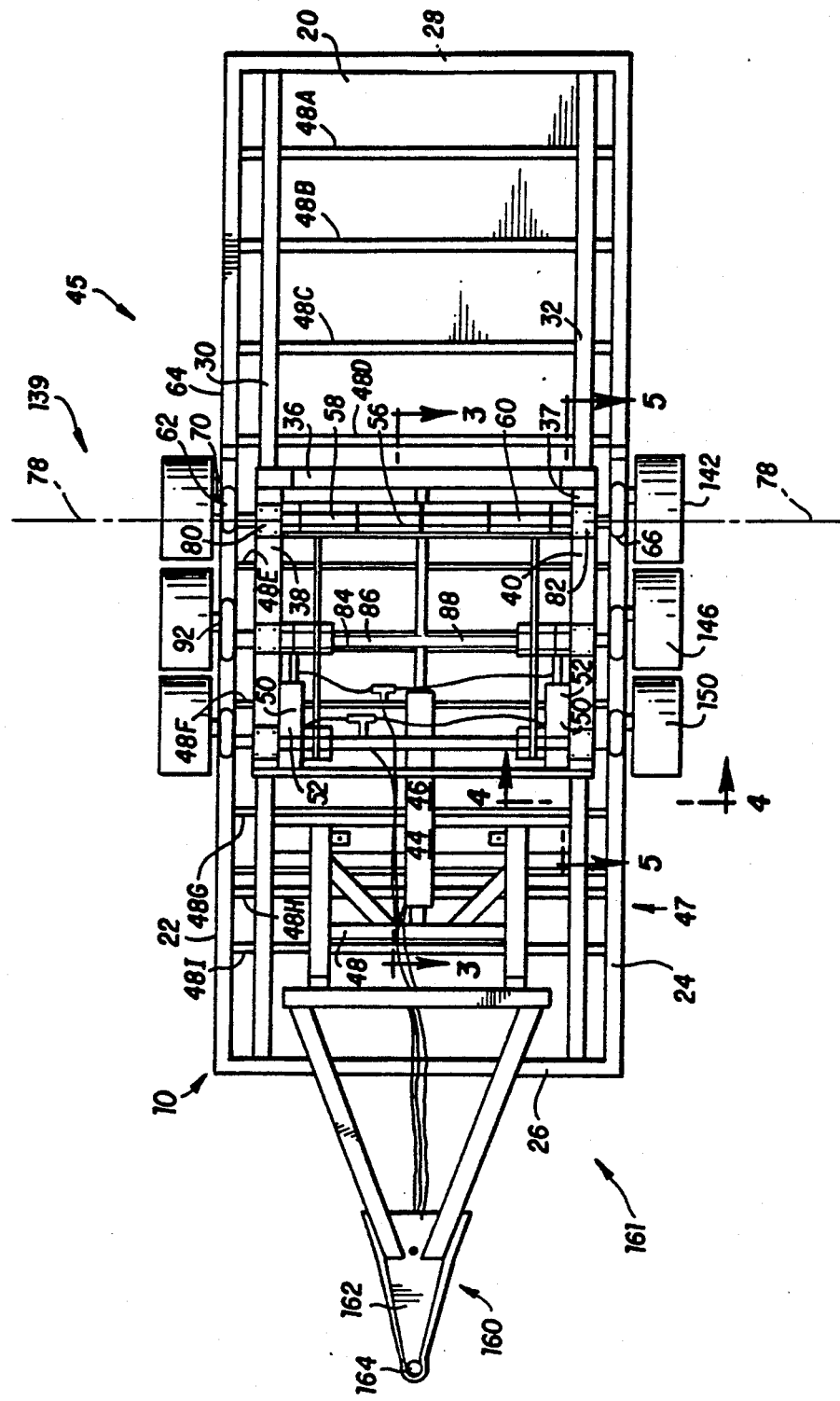
FIG. 2 is a bottom view of FIG. 1.

FIG. 2 is a bottom view of the apparatus 10 of the invention. Positioned between the third end 26 and fourth end 28 of the platform 20 is axle supporting frame 36. The axle supporting frame 36 is slidably mounted on first rail member 30 and second rail member 32. Bridging the first 30 and second 32 rails are a plurality of support members 48A–48I. The support members are secured to the rail members 30, 32 and the platform 20 is secured to the support members 48A–48I. The support members 48A–48I provide the necessary structure to support an object or vehicle positioned on the platform 20. Other methods of supporting the platform are within one skilled in the art. An axle frame moving means 44 is connected to a cross member of the tow bar assembly 161 and to the axle frame 36. Upon activation of the axle frame moving means 44 the axle supporting frame 36 moves from a first position 45 which is between the third end and fourth end of platform 20 to a second position 47 which is proximate the third end 26 of the platform 20. Preferably, the axle frame moving means 44 is a hydraulic ram 46 which when activated, slides the axle supporting frame 36 along the first 30 and second 32 rail members to the first 45 and to the second 47 position.

The trailer 10 is supported by a plurality of ground engaging wheels 139. A first axle 56 with a first end 58 and a second end 60 is rotationally mounted proximate the fourth side of the axle supporting frame 36. A first 80 and a second 82 pillow block is positioned proximate the first end 58 of the first axle and the second end 60 of the first axle 56 respectively. The pillow blocks 80, 82 secure the first axle 56 to the axle supporting frame 36 and enable the rotation of the first axle about a longitudinal axis 78 of the first axle 56. A first axle arm 62 and a second axle arm 66 is provided. Each axle arm 62, 66 includes a first end 62A, 66A and a second end 62B, 66B, respectively. Attached at the first end 58 of the first axle 56 in a perpendicular manner relative to the axis 78 of the first axle 56 is the first end 62A of the first axle arm 62. Attached at the second end 60 of the first axle 56 in a perpendicular manner relative to the axis 78 of the first axle 56 is the first end 66A of the second axle arm 66. The second end 62B of the first axle arm 62 of the first axle 56 further includes a first axle stud 70 perpendicularly positioned relative to the longitudinal axis 70A of the first axle arm 62 and parallel to the axis 78 of first axle 56. The second end 66B of the second axle arm 66 includes a second axle stud 74 perpendicularly positioned relative to the longitudinal axis 74A of the second axle arm 66 and parallel to the axis 78 of the first axle 56. Preferably, each axle stud extends outwardly relative to the axle arm to enable vertical movement of each wheel of the plurality of wheels without being obstructed by the platform 20 or its supporting structure during axle rotation as discussed below.

A second axle 84 is spaced apart from and parallel to the adjacent axle 56. The second axle 84 includes a first end 86 and a second end 88. The second axle 84 is secured to the axle supporting frame 36 by a first pillow block 108 and a second pillow block 110 positioned at the first end 86 and second end 88 of the second axle 84, respectively. A first axle arm 90 and a second axle arm 94 each include a first end 90A, 94A and a second end 90B, 94B, respectively. Attached at the first end 86 of the second axle 84 in a perpendicular manner relative to the axis 106 of the second axle 84 is the first end 90A of the first axle arm 90. Attached at the second end 88 of the second axle 84 in a perpendicular manner relative to the axis 106 of the second axle 84 is the first end 94A of the second axle arm 94. The second end 90B of the first axle arm 90 of the second axle 84 further includes a first axle stud 98 positioned perpendicular to the axis 98A of the first axle arm 90 and parallel to the axis 106 of second axle 84. The second end 94B of the second axle arm 94 includes an axle stud 100 positioned perpendicular to the axis 104A of the second axle arm 94 and parallel to the axis 106 of the second axle 104.

A third axle 112 is spaced apart from and parallel to adjacent second axle 84. The third axle includes a first end 114 and a second end 116. A first axle arm 118 and a second axle arm 122 each include a first end 118A and 122A and a second end 118B and 122B, respectively. Attached at the first end 114 of the third axle 112 in a perpendicular manner relative to the axis 134 of the third axle 112 is the first end 118A of first axle arm 118. Attached at the second end 116 of the third axle 112 in a perpendicular manner relative to the axis 134 of the third axle 112 is the first end 122A of the second axle arm 122. Positioned at each second ends 118B, 122B of the first and second axle arms 118, 122 is a first axle stud 126 and a second axle stud 128, respectively. The first axle stud 126 and second axle stud 128 are each positioned perpendicular relative to an axis 120 of the first axle arm 118 and an axis 124 of the second axle arm 122, respectively. The first axle stud 126 and second axle stud 128 are parallel to the axis 134 of the third axle 112. The third axle 112 is rotatably mounted to the axle supporting frame 36 by a first pillow block 136 and a second pillow block 138 positioned proximate the first end 114 and second end 116 of the third axle, respectively.

In order to move the mobile tilting trailer 10 over the ground 14, a plurality of ground engaging wheels 139 are used. A first ground engaging wheel 140 and a second ground engaging wheel 142 are rotatably positioned on the first axle stud 70 of the first axle 56 and the second axle stud 74 of the first axle 56, respectively. A third 144 and a fourth 146 ground engaging wheel are rotatably mounted to the first axle stud 98 and second axle stud 100 of the second axle 84, respectively. A fifth 148 and sixth 150 ground engaging wheel are rotatably mounted to the first axle stud 126 and second axle stud 128 of the third axle 112, respectively. Axle rotating means 50 enable the rotation of the axles to obtain a gradual loading position.

FIG. 3 is a sectional view illustrating an axle frame moving means 44 such as a hydraulic ram 46 having a first 46A and second 46B end. The first end 46A of the hydraulic 46 is connected to a support member 48 of platform 20. The second end 46B of the hydraulic ram is 46 is attached to the axle supporting frame 36 by an attachment member 36A which rotatably receives the second end 46B of the hydraulic ram 46 in order to enable the axle supporting frame 36 to be slid between a first position 45 and a second position 47. The axle rotating means 50 further includes an interlinking means 49. Interlinking means 49 includes a first interlinking bar 49A, a second interlinking bar 49B, a third interlinking bar 49C and a fourth interlinking bar 49D. Each interlinking bar 49A, 49B, 49C, 49D further includes a first end and a second end. The first interlinking bar 49A rotatably interconnects the second axle strut 76 of the first axle 56 with the second axle strut 104 of the second axle 84. The second interlinking bar 49B interconnects the second axle strut 104 of the second axle 84 with the second axle strut 132 of the third axle 112. The third interlinking bar 49C rotatably interconnects the first axle strut 74 of the first axle 56 with the first axle strut 102 of the second axle 84. The fourth interlinking bar 49D interconnects the first axle strut 102 of the second axle 84 with the first axle strut 130 of the third axle 112. This linkage enables simultaneous rotation of the axles when the axle rotating means 50 such as a hydraulic ram 52 is activated to rotate the axles. Preferably, the axles rotate proportionally to enhance the lowering of the loading end 28 of the platform 20.

FIGS. 4 and 4A illustrate the attachment of the axle supporting frame 36 to the first rail member 30. The supporting frame 36 is attached to the second rail member 32 in a like manner such that a description the first attachment is a description of the attachment of the second. Preferably, at least one of the sliding surfaces 30A of the first rail member 30 or the sliding surface 36A of the axle supporting frame is provided with a self-lubricating material such as Teflon, polypropylene and the like. The second end 130A of the first axle strut 130 is securely attached to the third axle 112 proximate the first end 114 of the third axle 112. The second end 130B of the first axle strut 130 of the third axle 112 is rotatably connected to interlinking bar 49D.

FIG. 5 illustrates an enhanced view of a portion of FIG. 3. FIG. 5 illustrates the preferred use of a torsion axle 55 having compressed rubber 55A (see FIG. 11) in a portion of the tubular length of the axle 55. The torsion axle provides a suspension-like attachment of the ground engaging wheels to the platform. This provides for greater stability of both the load being hauled and of the trailer during hauling.

Figure 6:
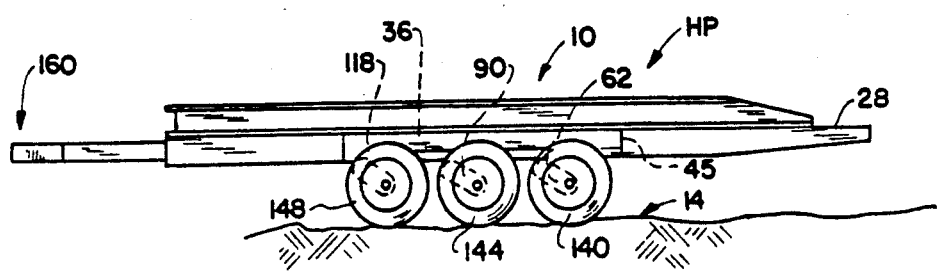
FIG. 6 is a side view of the apparatus of the invention in a hauling position.
Figure 7:
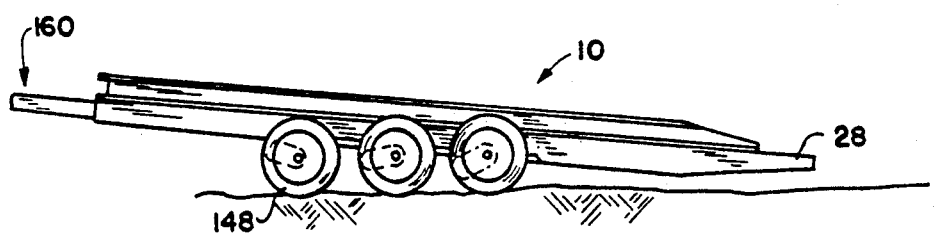
FIG. 7 is a side view of the apparatus of the invention in a partially lowered position.
Figure 8:
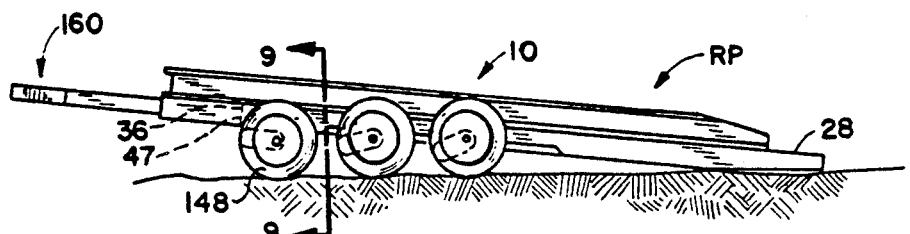
FIG. 8 is a side view of the apparatus of the invention in a ramp position.

FIGS. 6, 7 and 8 illustrate the mobile tilting trailer of the invention in a sequential presentation from a hauling position at FIG. 6, to a position between the hauling position and the ramp position at FIG. 7 and to a ramp position at FIG. 8. The platform 20 defines a hauling position "HP" when the axle(s) are rotated such that the corresponding axle arms of each axle are rotated such that the axle is distally positioned relative to the ground to a first location where each of the studs of each axle is located closer to the ground and the axle supporting frame is positioned at the first position 45. The position illustrated at FIG. 7 is the result of proportional rotation of the first 56, second 84 and third 112 axles such that each axle varies in its proximity relative to the ground 14 to enable a slanted platform or partially lowered position. The platform 20 to define a ramp position "RP" when the axle(s) are rotated, thereby rotating the corresponding axle arms of each axle such that the axle(s) is proximate the ground and the axle supporting frame is positioned at the second position 47.

Figure 9:
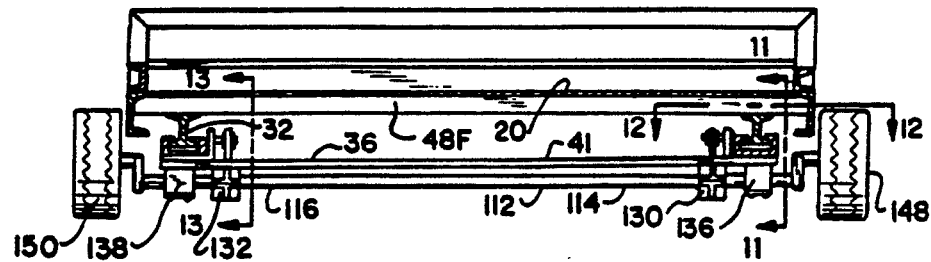
FIG. 9 is a sectional view taken along line 9—9 of FIG. 8.

FIG. 9 illustrates the third axle 112 with the first axle strut 130 and the second axle strut 132 securely attached thereto in order to apply rotational force to the axle 112. The third axle 112 is rotatably secured to the axle supporting frame 36 by a first pillow block 136 and a second pillow block 138. The axle supporting frame 36 is slidably secured to the first rail member 30 and to the second rail member 32 to enable the axle supporting frame 36 to be moved to a first position 47 and to a second position 47. Support member 48F is secured to the rail members 30, 32 to provide structural support to the overlying portion of platform 20 and the objects placed thereon. The struts are positioned and secured in like manner to the other axles of the trailer 10. Preferably, the first and second struts of each axle are positioned in the same plane.

Figure 10:
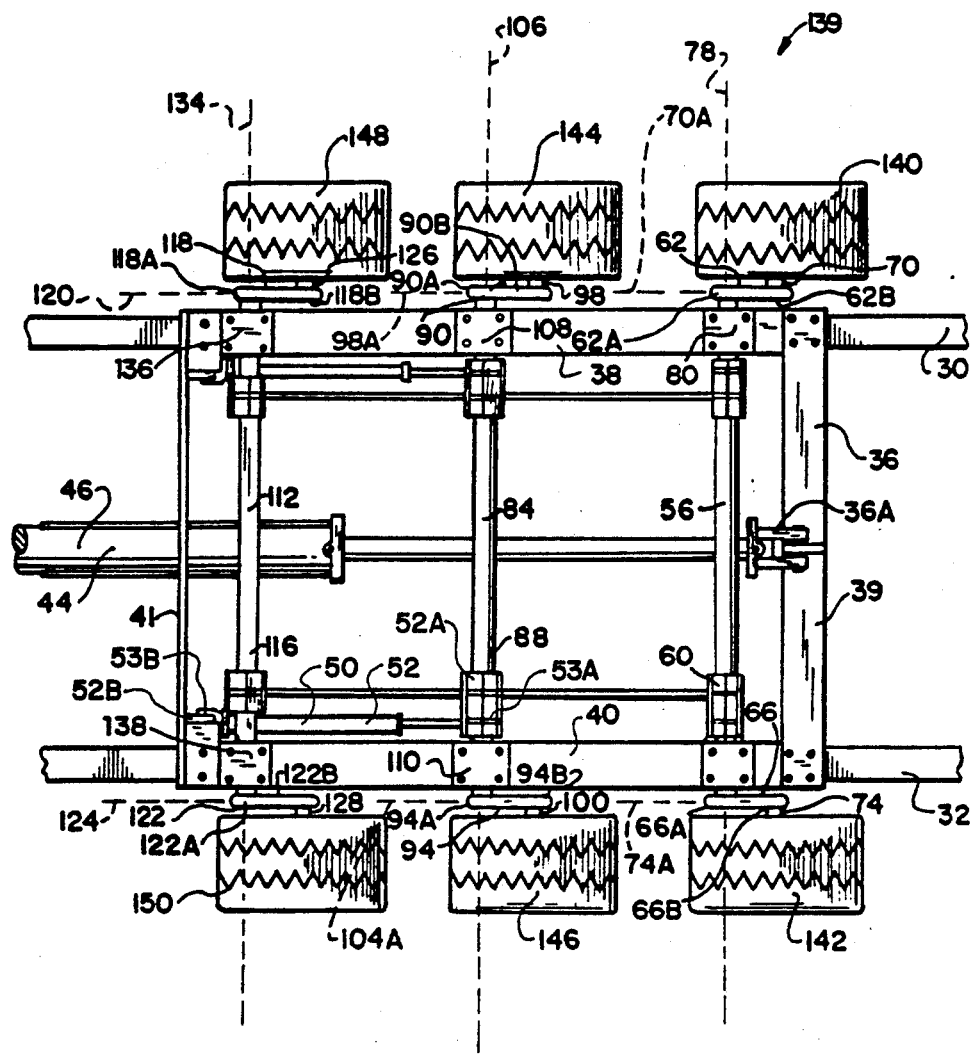
FIG. 10 is an enlarged partial view of FIG. 2.

FIG. 10 is an enlarged partial view of FIG. 2 to illustrate the axle rotating means 50 and the axle supporting frame 36. The axle supporting frame 36 includes a first side 38 and a second side 40. Preferably, the first side 38 and the second side 40 are linked together by a third side 39 and a fourth side 41. The resulting frame 36 enhances simultaneous and equivalent sliding of the first side 38 relative to the second side 40 of the frame 36 along the first 30 and second 32 rail members when the axle frame moving means 44 is activated. Other structures which insure that the first side 38 and the second side 40 of the frame 36 slide to an equivalent extent along the first 30 and second 32 rail members when the axle frame moving means 44 is activated are also within the scope of this invention. For example, each first and second side of the axle supporting frame may be provided with its own frame moving means 44 to move the frame to the first and second positions. Such a structure may not require the third 39 and fourth sides 41 of the axle supporting frame 36 where a single axle frame moving means 44 is provided.

The axle rotating means 50 includes a hydraulic ram 52 with a first end 53A rotatably secured to the second axle 84 by an axle connecting member 52A and with a second end 53B rotatably secured to the axle supporting frame 36 by an axle frame connecting member 52B. The axle frame moving means 44 is preferably a hydraulic ram 46 which moves the frame 36 to the first position 45 or hauling position and to the second position 47 or loading position. Once the cargo is loaded onto the platform 20 of the trailer 10, the frame 36 is moved by the ram 46 from the loading position 47 to the hauling position 45 and the axles are rotated to attain a level platform 20.

Figure 11:
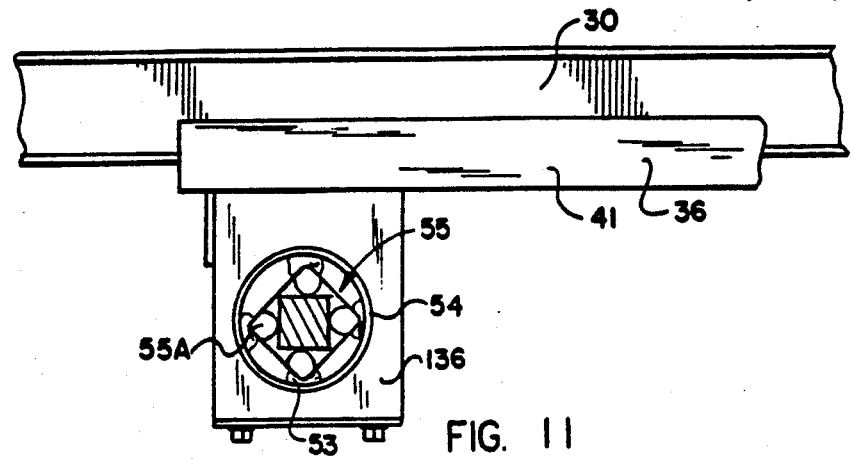
FIG. 11 is a view taken along line 11—11 of FIG. 9.

FIG. 11 illustrates torsion axle 55 with the compressed rubber 55A to provide a suspension like ride without the massive undercarriage necessary for more conventional suspension systems. The torsion axle 55 is secured within a sleeve 54, by for example plug welding 53, to ensure that the axle 55 rotates upon activation of the axle rotating means. Each axle end includes a sleeve and is similarity attached to the respective pillow block. Pillow block 136 rotatably secures the torsion axle 55 to the axle supporting frame 36. Other methods of rotatably attaching the torsion axle(s) to the axle supporting frame are within those skilled in the art.

Figure 12:
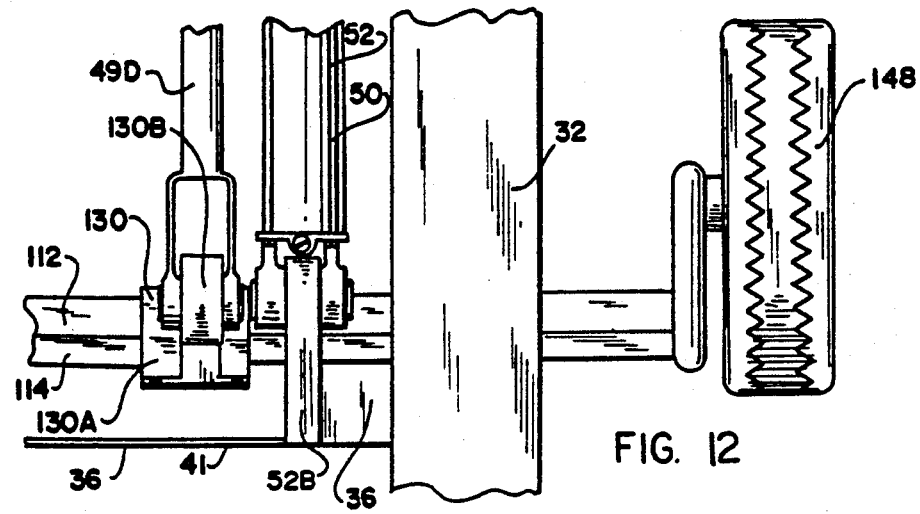
FIG. 12 is a view taken along line 12—12 of FIG. 9.

FIG. 12 illustrates the rotatable connection of the interlinking bar 49D of the interlinking means 49 to the first axle stud 130 of the third axle 112. The rotatable connection of the axle rotating means 50 to the axle supporting frame 36 is axle connecting member 52B.

Figure 13:
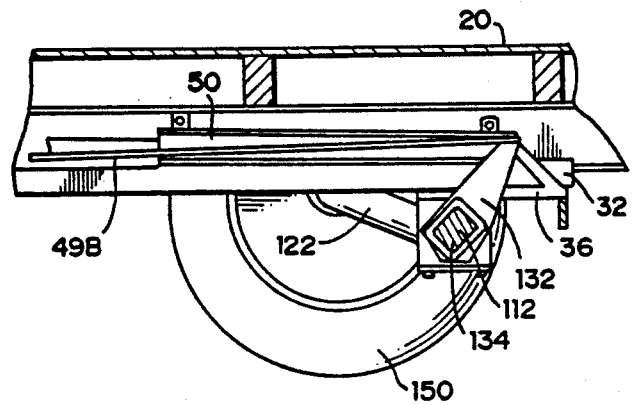
FIG. 13 is a view taken along line 13—13 of FIG. 9.

FIG. 13 illustrates the connection of the interlinking bar 49B to the second axle strut 132 positioned at the second end 116 of the third axle 112. In use the second axle strut 132 is forced by the movement of the interlinking bar 49B to rotate the third axle 112 about its longitudinal axis 134. This result in the rotation of the second axle arm 122 which changes the height of the axle 112 relative to the ground 14. Thus, when the trailer 10 is in a hauling position, each axle is equally positioned from the ground relative to each other. Preferably, in the hauling position the axles are rotated to a position which provides maximum ground clearance of the trailer 10.

Figure 14:
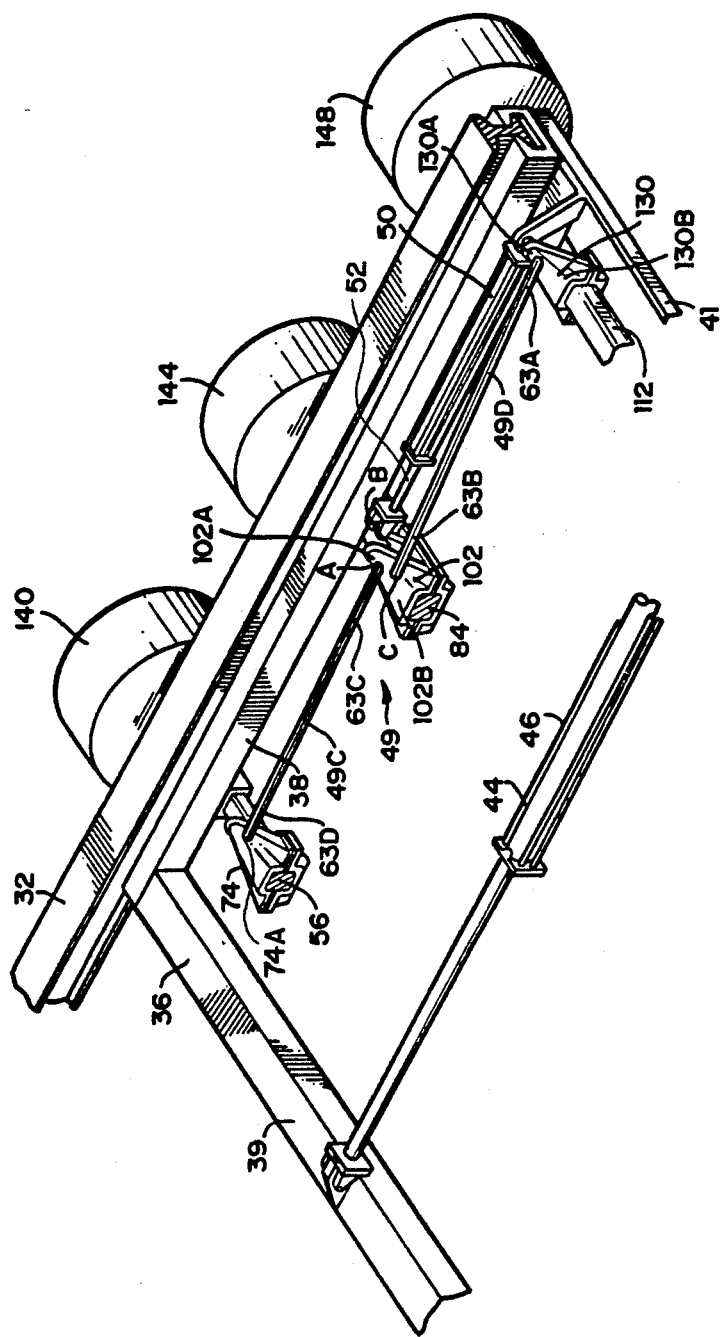
FIG. 14 is a partial view of FIG. 1.

FIG. 14 illustrates the interlinking means 49 of the axle rotating means 50 connected to the first end 58, 86, 114 of each of the first 56, second 84 and third 112 axles, respectively. The interlinking means 49 of the axle rotating means 50 connected to the second end 60, 88, 116 of each of the first 56, second 84 and third 112 axles, respectively, is the same as that illustrated. The first axle strut 102 further includes a first end 102A and a second end 102B. The interlinking bar 49D includes a first end 63A and a second end 63B. The first end 63A is rotatably connected to the first end 130A of the first axle strut 130 of the third axle 112 and the second end 63B of the interlinking bar 49D is rotatably connected to the second end 102B of the first axle strut 102 of the second axle 84. The interlinking bar 49C further includes a first end 63C and a second end 63D. The first end 63C is connected at the first end 102A of the first axle strut 102 of the second axle 84 with the second end 63D of the interlinking bar 49C is connected at the first end 74A of the first axle strut 74 of the first axle 56. Thus, when the axle rotating means 50 is activated, the second end 63B of the interlinking bar 49D which is positioned at the second end 102B of the first axle strut 102 of the second axle 84, moves through a smaller arc relative to the arc of the first end 63C of the interlinking bar 49C which is positioned at the first end 102A of the first axle strut 102 of the second axle 84 to result in a greater rotation of the first axle 56 relative to the third axle 112. The axle rotation means 50 is connected to the axle frame connecting member 52B at a point "B" on the axle frame connecting member 52B. Point "B" is between the connection point "A" of the first end 63C of the interlinking bar 49C at the first end 102A of the axle strut 102 and the connection point "C" of the second end 63B of the interlinking bar 49D at the second end 102B of the axle strut 102. A similar connection of the interlinking means 49 is used at the second axle struts 76, 104, 132 of the axles 56, 84, 112, respectively including the axle rotation means 50.

Preferably, the interlinking means 49 is positioned at both the first end and second end of each axle of the plurality of axles in a manner to enable the axle arms of each axle rotate proportionally with the axle nearest the loading end rotating the greatest extent and with each successive axle from the axle nearest the loading end of the platform rotating to a lesser extent to define a tilted position with the loading end of the trailer proximate the ground. Also, each axle arm of each axle positioned on the axle supporting frame, is preferably in a similar plane and each axle arm rotates in a same plane. Thus, when the axle is rotated, the axle arms of the rotated axle rotate in the same plane and to the same extent such that the first end and the second end of axle are substantially the same distance from the ground.

Upon proportional rotation of axles 56, 84 and 112 the respective axle arms 62, 66, 90, 94 and 118, 122 partially rotate to provide a partial ramp position illustrated at FIG. 7. The axle arms 62, 66 of the first axle 56, which are positioned nearest the fourth end or loading end 28, rotate to a greater degree than the axle arms of either the second axle 84 or third axle 112. The axle arms 90, 94 of the second axle 84 rotate to a greater degree than the axle arms of the third axle 112. As a result of proportional rotation of the axle arms 62, 66, 90, 94, 118, 122 their respective axles 56, 84, 112 are each positioned at a different height relative to the ground 14. First axle 56 is positioned closest to the ground with second axle 84 being positioned a little further from the ground relative to the first axle. Third axle 112 is positioned still further from the ground relative to the second axle 84. Proportionally rotating the axle arms insures that the plurality of ground engaging wheels 139 remain equally in contact with the ground to equally support the platform during the positioning of a self powered object such as an automobile thereon. Most importantly, proportionally axle rotation insures that the first end 22 and the second end 24 of the platform are equally supported such that neither the first end 22 nor the second end 24 drops relative to the other to provide an evenly supported platform. Proportional rotation of the axle arms defines a partial ramp position such that by moving the axle supporting frame 36 to the second position 47 the fourth end of the platform engages the ground to provide support for the fourth end 28 of the platform 20. The combination of the movable axle supporting frame and the axle arms enable a gradual incline not present in the prior art. As the vehicle 13 is positioned on the platform 20 of the trailer 10, the plurality of wheels 139 equally supports the platform 20 such that the tow bar 162 is not pushed downward by the increased weight of the vehicle being positioned thereon. Preferably, the wheel well 12 is positioned on the platform 20 between the second axle 84 the third axle 112 to aid in preventing the weight of the vehicle from pushing downward on the tow bar 162 by limiting its approach to the third end of the platform. Preferably, the first position of the axle supporting frame is such that the object to be hauled is positioned overhead to aid in the balancing of the load on the trailer 10.

Figure 15:
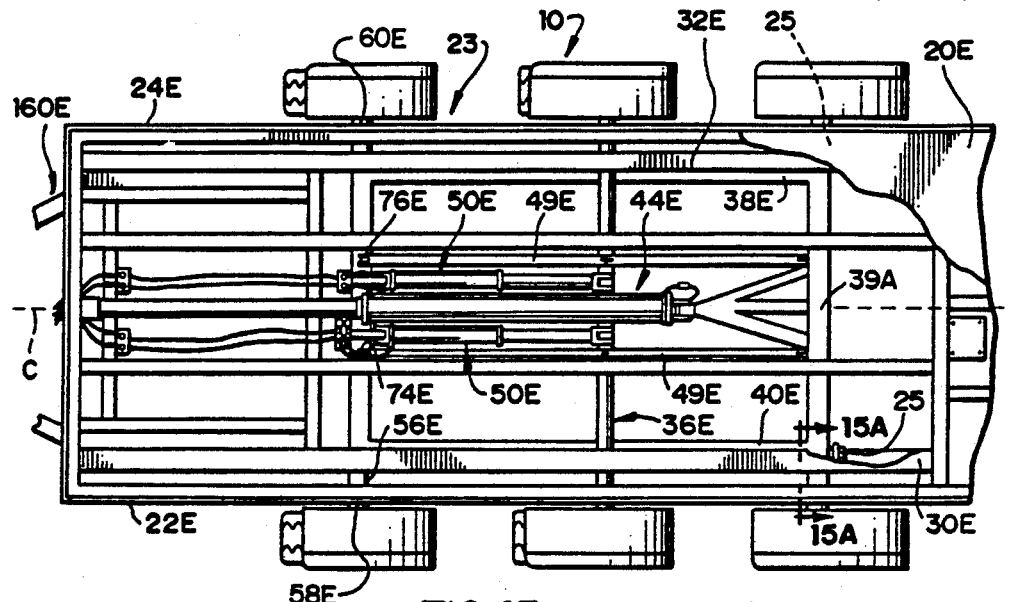
FIG. 15 is partial top view of a main chassis platform supporting structure.

FIG. 15 is a partial top view illustrating a different support configuration for the platform 20E. In this embodiment a main chassis structure 23 is used to support the platform 20A. The reference characters are identical to the reference character as described and illustrated above; however, similar parts are referred to with the suffix "E". The advantage of a main chassis system is that the supporting structure and the supported platform 20E may be bolted together without the requirement for welding as in a unibody type chassis of FIG. 1. Another advantage of the main chassis system is the relative ease of repairability of the system with common hand tools. The center line "C" of the platform is a line which is equally positioned form the first end 22E and second end 24E of the platform 20E. In this embodiment the struts, such as the first 74E and second 76E axle struts of the first axle 56E, are securely positioned inwardly relative to the first 58E and second 60E ends of the first axle 56E at positions equidistant from the center line "C" of the platform 20E. Preferably, the interlinking means 49E is equidistantly positioned on each axle of the plurality of axles from the center line of the platform in a manner to enable the axle arms of each axle to rotate proportionally with the axle as described above.

Figure 15A:
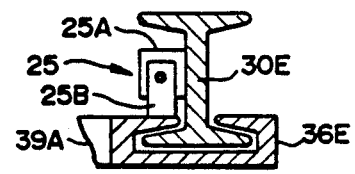
FIG. 15A is a view of the alignment means taken along line 15A—15A of FIG. 15.

Preferably, the mobile tilting trailer 10, 10E includes an alignment means 25 for aligning the axle supporting frame 36E thereby ensuring proper tracking of the mobile tilting trailer 10E when being towed by a towing vehicle and further ensuring maximum tire wear. Preferably, an alignment means 25 is positioned at each rail member 30E and 32E. FIG. 15A illustrates the alignment means 25 positioned at rail member 30E. For sake of brevity, the alignment means positioned at rail member 32E is similar in construction and is not shown. The alignment means 25 includes a first boss 25A, 25C (not shown) attached to each first and second rail members 30E, 32E. A second boss 25B, 25D (not shown) is attached to the axle frame 36E at each first side 38E (not shown) and second side 40E, respectively, proximate the third side 39A of the axle frame 36E.

Figure 16:
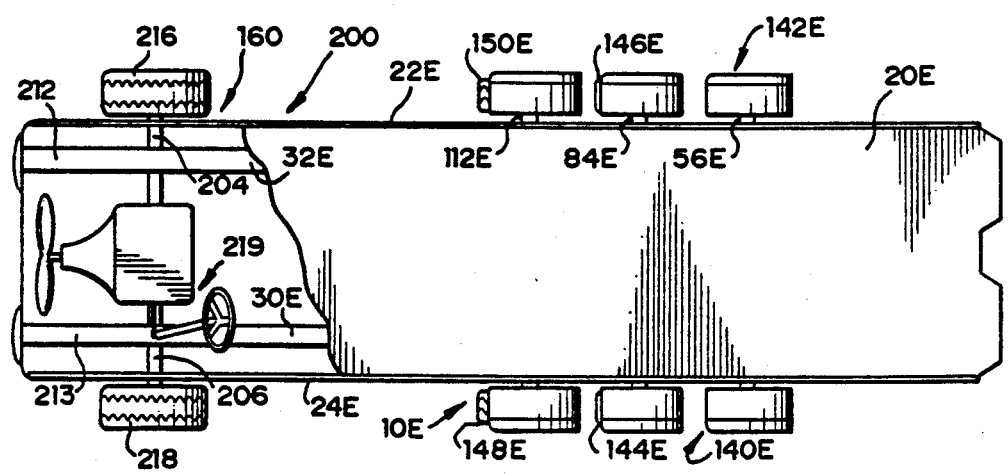
FIG. 16 is top view of a further embodiment of the tilting trailer.

FIG. 16 illustrates a front wheel drive vehicle 200 with a supporting frame. The front portion of the frame pivots on a first front axle and a second front axle to enable the rear portion of the frame to be raised or lowered relative to the front portion in a manner as described above and illustrated at FIGS. 6–8. The front wheel drive motor vehicle includes a platform 20E. The platform supports and carries articles positioned thereon and has a first end, a second end, a third end and a fourth end. The supporting frame comprises a first 30E and a second 32E rail member with each of the rail members positioned between the first 22E end and the second 24E end of the platform 20E. The first rail member is spaced apart relative to the second rail member in a parallel manner and each of the rail members is securely fastened to the platform. Each first and second rail members have a front end and a rear end. A first front axle 204 and the second front axle 206 are each rotatably and supportably positioned proximate each front end of each of the first and second rail members, respectively. A motive means 160, such as an internal combustion engine, is connected to each first front axle and second front axle to enable the platform to be moved along the ground by rotatably driving a first front ground engaging wheel and a second front ground engaging wheel secured to the first and second front axles, respectively. A steering means 219 is steeringly connected to a first 216 and second 218 ground engaging wheels to enable steering of the vehicle. Each first front and second front ground engaging wheel is rotatably secured to each the first front axle and the second front axle for movably supporting the platform and the articles placed thereon and for enabling the front end of each of the first and second rail members to pivot about the first and second front axles thereby permitting the rear portion of each of the first and second rail members to be raised and lowered relative to the front end of each the first and the second rail members utilizing the apparatus of the invention 10 as discussed above. The axle supporting frame, the first axle, including additional axles such as the second and third axles, if present, the axle supporting frame moving means, the axle arms of the first axle and any additional axles, the studs, the ground engaging wheels rotatably attached to each of the studs for movably supporting the platform and the articles placed thereon and the axle rotating means are as described above. In use the platform, positioned proximate the rear end of the first and second rail member, defines a ramp position when the axle(s) is rotated thereby rotating the axle arms such that the axle(s) is proximately positioned relative to the ground and the axle supporting frame is positioned at the second position and the platform defines a hauling position when the axle is further rotated thereby rotating the axle arms such that the axle(s) is distally positioned relative to the ground and the axle supporting frame is positioned at the first position. During the raising and lowering of platform 20E the first and second ground engaging wheels are preferably positioned in the same plane as the wheels 142E, 140E; 146E, 144E; 150E, 148E attached to the first 56E, second 84E and third 112E axles, respectively.

The present invention includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:
1. A tilting mobile platform comprising:
 a platform for supporting and carrying articles positioned thereon and having a first end, a second end, a third end and a fourth end;

a first and a second rail member with each of said rail members positioned between said first end and said second end of said platform with said first rail member being spaced apart relative to said second rail member in a parallel manner and each said rail members being securely fastened to said platform;

an axle supporting frame having a first side and a second side with said first side being slidably secured to said first rail member and said second side being slidably secured to said second rail member such that said axle supporting frame slides between said third end and said fourth end of said platform;

a first axle having a first end and a second end with said first end of said axle being rotatably attached to said first side of said axle supporting frame and said second end of said first axle being rotatably attached to said second side of said axle supporting frame such that said axle is transversely mounted on said axle supporting frame relative to a path of movement of said axle supporting frame along said rail members;

an axle supporting frame moving means for moving said axle supporting frame along said first and said second rail members from a first position wherein said axle supporting frame is positioned between said third end and said fourth end of said platform to a second position wherein said axle supporting frame is positioned proximate said third end of said platform and from said second position wherein said axle supporting frame is positioned proximate said third end of said platform to said first position wherein said axle supporting frame is positioned between said third end and said fourth end of said platform;

a first axle arm and a second axle arm with each said axle arm having a first end and a second end with said first end of each first and second axle arms being securely attached to each said first and second ends of said axle such that each said axle arm extends perpendicularly relative to an axis extending through said axle;

a first stud and a second stud secured at each said second end of said first and said second axle arms such that each said stud extends perpendicularly relative to an axis extending through said axle arm and parallel relative to said axis extending through said axle;

a first and a second ground engaging wheel rotatably attached to each of said first and said second studs respectively for movably supporting said platform and the articles placed thereon;

said platform including a means to enable said platform to be moved along said ground; and an axle rotating means to rotate said axle about an axis extending from said first end to said second end of said axle such that in use said platform defines a ramp position when said axle is rotated thereby rotating said first and second axle arms such that said first axle is proximately positioned relative to the ground and said axle supporting frame is positioned at said second position and said platform defines a hauling position when said axle is further rotated thereby rotating said first and second axle arms such that said first axle is distally positioned relative to the ground and said axle supporting frame is positioned at said first position.

2. The tilting platform of claim 1 wherein said means to enable said platform to be moved along said ground is a tow bar secured proximate said third end of said platform to enable the towing of said tilting platform by a towing vehicle.

3. The tilting platform of claim 1 wherein said axle is a torsion axle to provide a cushioned suspension.

4. The tilting platform of claim 1 wherein said axle rotating means and said axle supporting frame moving means are hydraulic rams.

5. The tilting platform of claim 1 further including a second axle spaced apart in a parallel manner relative to said first axle and having a first end and a second end with said first end of said second axle being rotatably attached to said first side of said axle supporting frame and said second end of said second axle being rotatably attached to said second side of said axle supporting frame such that said second axle is transversely mounted on said axle supporting frame relative to a path of movement of said axle supporting frame along said rail members;

a first and a second axle arm with each said axle arm having a first end and a second end with said first end of each first and second axle arms being securely attached to each said first and second ends of said axle such that each said axle arm extends perpendicularly relative to an axis extending through said axle;

each said second end of said first and said second axle arms further include a first and a second stud secured thereat and extending perpendicularly relative to an axis extending through said axle arm and parallel relative to said axis extending through said axle;

a third and a fourth ground engaging wheel rotatably attached to each of said first and said second parallel studs of said second axle respectively for movably supporting said platform and the articles placed thereon; and said axle rotating means further including a means for rotating said second axle with said first axle about an axis extending from said first end to said second end of said second axle such that in use said platform defines a ramp position when said first and second axles are rotated thereby rotating said first and second axle arms of each said axles such that each said axle is proximately positioned relative to the ground and said axle supporting frame is positioned at said second position and said platform defines a hauling position when said first and second axles are further rotated thereby rotating each said first and second axle arms of said axles such that each said axle is distally positioned relative to the ground and said axle supporting frame is positioned at said first position.

6. The tilting platform of claim 5 wherein said axle rotating means rotates each said first and second axles proportionally such that said first axle is closer to the ground relative to said second axle to provide a more gradual loading angle of said ramp position of said platform.

7. The tilting platform of claim 5 wherein said axle rotating means includes a hydraulic ram secured to one of said first and second axles.

8. The tilting platform of claim 6 wherein said first axle and said second axle are rotated proportionally; and said means for rotating said second axle proportionally with said first axle includes an interlinking means for rotationally interconnecting said first axle with said second axle to enable said first and said second axles to proportionally rotate when said axle rotating means are activated.

9. The tilting platform of claim 8 wherein said interlinking means comprises a first and a second strut securely positioned proximate each said first and said second ends of each of said first and second axles respectively with each of said first and second struts extending substantially perpendicular relative to an axis extending through said axle to which said first and second struts are secured;

each first strut and second strut further including a first end and a second end with said first end of each said strut distally positioned relative to said axle and said second end of each said strut proximately positioned relative to said axle;

a first interlinking bar having a first end and a second end;

said first end of said first interlinking bar being rotatably attached to said first strut of said first axle to define a first connection point and said second end of said interlinking bar rotatably attached to said first strut of said second axle to define a second connection point such that said first and second connection points are equally spaced from said first axle and said second axle, respectively, thereby interconnecting each first strut of each said first and second axles;

a second interlinking bar having a first end and a second end;

said first end of said second interlinking bar being rotatably attached to said second strut of said first axle to define a third connection point and said second end of said second interlinking bar rotatably attached to said second strut of said second axle to define a fourth connection point such that said third and fourth connection points are equally spaced from said first axle and said second axle, respectively thereby interconnecting each second strut of said first and second axles;

an axle connecting member having a first end and a second end with said second end secured said second axle; and said axle rotating means including a hydraulic ram with a first end and a second end with said first end of said hydraulic ram rotatably secured to said first end of said axle connecting member to define a fifth connection point such that said fifth connection point is positioned closer to said second axle relative to said first, second, third, and fourth connection points to enable said first axle to rotate a greater extent relative to said second axle when said hydraulic ram is activated to provide for proportional and simultaneous rotation of said first and said second axles.

10. The tilting platform of claim 5 further including a third axle spaced apart in a parallel manner relative to said second axle and having a first end and a second end with said first end of said third axle being rotatably attached to said first side of said axle supporting frame and said second end of said third axle being rotatably attached to said second side of said axle supporting frame such that said third axle is transversely mounted on said axle supporting frame relative to a path of movement of said axle supporting frame along said rail members;

a first and a second axle arm with each said axle arm having a first end and a second end with said first end of each first and second axle arms being securely attached to each said first and second ends of said third axle such that each said axle arm extends perpendicularly relative to an axis extends through said third axle;

each said second end of said first and said second axle arms further include a first and a second stud secured thereat and extending perpendicularly relative to an axis extending through said axle arm and parallel relative to said axis extending through said third axle;

a fifth and a sixth ground engaging wheel rotatably attached to each of said first and said second studs of said third axle respectively for movably supporting said platform and the articles placed thereon; and said axle rotating means further including a means for rotating said third axle about an axis extending from said first end to said second end of said third axle such that in use said platform defines a ramp position when said first, second and third axles are rotated thereby rotating said first and second axle arms of each said axles such that each said axle is proximately positioned relative to the ground and said axle supporting frame is positioned at said second position and said platform defines a hauling position when said first, second and third axles are further rotated thereby rotating each said first and second axle arms of each of said axles such that each said axle is distally positioned relative to the ground and said axle supporting frame is positioned at said first position.

11. The tilting platform of claim 10 wherein said axle rotating means includes a hydraulic ram.

12. The tilting platform of claim 10 wherein said first axle, said second axle and said third axle rotate proportionally to provide a more gradual loading angle of said ramp position of said platform.

13. The tilting platform of claim 12 further comprising a hydraulic ram and wherein said means for rotating said second and third axles proportionally with said first axle includes an interlinking means for rotationally interconnecting said first axle with said second and third axles to enable said first, said second and said third axles to proportionally and simultaneously rotate when said hydraulic ram is activated;

each said first strut and said second strut further including a first end and a second end with said first end of each said strut distally positioned relative to said axle and said second end of each said strut proximately positioned relative to said axle;

said interlinking means including:

a first interlinking bar having a first end and a second end;

said first end of said first interlinking bar being rotatably attached to said first strut of said first axle to define a first connection point and said second end of said interlinking bar rotatably attached to said first strut of said second axle to define a second connection point such that said first and second connection points are equally spaced from said first axle and said second axle, respectively, thereby interconnecting each first strut of each said first and second axles;

a second interlinking bar having a first end and a second end;

said first end of said second interlinking bar being rotatably attached to said second strut of said first axle to define a third connection point and said second end of said second interlinking bar rotatably attached to said second strut of said second axle to define a fourth connection point such that said third and fourth connection points are equally spaced from said first axle and said second axle, respectively thereby interconnecting each second strut of said first and second axles;

a third interlinking bar having a first end and a second end;

said first end of said third interlinking bar being rotatably attached to said second end of said first strut of said second axle to define a fifth connection point and said second end of said interlinking bar rotatably attached to said first strut of said third axle to define a sixth connection point such that said fifth connection point is proximate said second axle relative to said sixth connection point thereby interconnecting each first strut of said second and third axles;

a fourth interlinking bar having a first end and a second end;

said first end of said fourth interlinking bar being rotatably attached to said second end of said second strut of said second axle to define an seventh connection point and said second end of said fourth interlinking bar rotatably attached to said second strut of said third axle to define a eighth connection point such that said seventh connection point is proximate said second axle relative to said eighth connection point thereby interconnecting each first strut of said second and third axles;

an axle connecting member having a first end and a second end with said second end secured said second axle; and said axle rotating means including a hydraulic ram with a first end and a second end with said first end of said hydraulic ram rotatably secured to said first end of said axle connecting member to define a fifth connection point such that said fifth connection point is positioned closer to said second axle relative to said first, second, third, fourth, eighth and ninth connection points and said fifth connection point is positioned further away from said second axle relative to said sixth and seventh connection points to enable said first axle to rotate a greater extent relative to said second axle when said hydraulic ram is activated to provide for proportional and simultaneous rotation of said first, second and third axles.

14. The tilting platform of claim 1 wherein said platform is positioned between said first end and said second end of said axle in order to permit said first and second axle arms to rotate through a plane extending from said upper surface of said platform.

15. A tilting mobile platform comprising:

a platform for supporting and carrying articles positioned thereon having a first end, a second end, a third end and a fourth end;

a first and a second rail member with each of said rail members positioned between said first end and said second end of said platform with said first rail member being spaced apart relative to said second rail member in a parallel manner and each said rail members being securely fastened to said platform;

an axle supporting frame slidably attached to said first and said second rail members and having a first side and a second side with said first side being slidably secured to said first rail member and said second side being slidably secured to said second rail member such that said axle supporting frame in use slides between said third end and said fourth end of said platform;

a plurality of axles with each axle of said plurality of axles having a first end and a second end with said first end of each said axle of said plurality of axles being rotatably attached to said first side of said axle supporting frame and said second end of each said axle of said plurality of axles being rotatably attached to said second side of said axle supporting frame such that each said axle of said plurality of axles is spaced apart from each other axle in a parallel manner and is transversely mounted on said axle supporting frame relative to a path of movement of said axle supporting frame along said rail members;

an axle supporting frame moving means for moving said axle supporting frame along said first and said second rail members from a first position wherein said axle supporting frame is positioned between said third end and said fourth end of said platform to a second position wherein said axle supporting frame is positioned proximate said third end of said platform and from said second position wherein said axle supporting frame is positioned proximate said third end of said platform to said first position wherein said axle supporting frame is positioned between said third end and said fourth end of said platform;

each said first end and said second end of each said axle of said plurality of axles further include a first axle and a second axle arm having a first end and a second end with each first end of each first and second axle arms being securely attached to each said first and second ends respectively of each said axle of said plurality of axles in a manner such that each said axle arm extends perpendicularly relative to an axis extending through each said axle;

each said second end of each said first and said second axle arms further include a first and a second stud securely attached thereat and each said stud extending perpendicular relative to an axis extending through said axle arm and parallel to said axis extending through said axle;

a plurality of ground engaging wheels where each ground engaging wheel is rotatably attached to each of said first and said second studs respectively for movably supporting said platform and the articles placed thereon;

said platform including a means to enable said platform to be moved along said ground positioned proximate said third end of said platform;

an axle rotating means to rotate each said axle of said plurality of axles about an axis extending from said first end to said second end of each said axle of said plurality of axles such that in use said platform defines a ramp position when each said axle of said plurality of axles is rotated thereby rotating said first and second axle arms of each axle of said plurality of axles such that each said axle of said plurality of axles is proximately positioned relative to the ground and said axle supporting frame is positioned at said second position and said platform defines a hauling position when each said axle of said plurality of axles is further rotated thereby rotating said first and second axle arms of each axle of said plurality of axles such that each axle of said plurality of axles is distally positioned relative to the ground and said axle supporting frame is positioned at said first position.

16. The tilting platform of claim 15 wherein said axle rotating means includes a hydraulic ram.

17. The tilting platform of claim 16 wherein said means for rotating each said axle of said plurality of axles includes an interlinking means for rotationally interconnecting each said axle of said plurality of axles with said hydraulic ram to enable each said axle of said plurality of axles to rotate when said hydraulic ram is activated.

18. A tilting mobile platform comprising:
   a platform having a first end, a second end, a third end and a fourth end;
   said platform having a lower surface and an upper surface with said upper surface for supporting and carrying articles positioned thereon;
   a first and a second rail member with each of said rail members positioned between said first end and said second end of said platform with said first rail member being spaced apart relative to said second rail member in a parallel manner and each said rail members being securely fastened to said platform;
   an axle supporting frame slidably attached to said first and said second rail members and having a first side and a second side with said first side being slidably secured to said first rail member and said second side being slidably secured to said second rail member such that said axle supporting frame slides between said third end and said fourth end of said platform;
   a first axle and a second axle with each axle having a first end and a second end with each said first end of each said axle being rotatably attached to said first side of said axle supporting frame and each said second end of each said first axle being rotatably attached to said second side of said axle supporting frame such that each said axle is transversely mounted on said axle supporting frame relative to a path of movement of said axle supporting frame along said rail members;
   an axle supporting frame moving means for moving said axle supporting frame along said first and said second rail members from a first position wherein said axle supporting frame is positioned between said third end and said fourth end of said platform to a second position wherein said axle supporting frame is positioned proximate said third end of said platform and from said second position wherein said axle supporting frame is positioned proximate said third end of said platform to said first position wherein said axle supporting frame is positioned between said third end and said fourth end of said platform;
   first and second axle arms with each said axle arm having a first end and a second end with said first end of each first and second axle arms being securely attached to each said first and second ends of each said axle such that each said axle arm extends perpendicularly relative to an axis extending through said respective axle;
   each said second end of each said first and said second axle arms further includes a first and a second stud secured thereat and extending perpendicularly relative to an axis extending through said respective axle arm and parallel relative to said axis extending through said respective axle;
   a first and a second ground engaging wheel rotatably attached to each of said first and said second studs of said first axle respectively for movably supporting said platform and the articles placed thereon;
   a third and a fourth ground engaging wheel rotatably attached to each of said first and said second studs of said second axle respectively for movably supporting said platform and the articles placed thereon;
   said platform including a tow bar positioned proximate said third end of said platform to enable said platform to be moved along said ground; and
   an axle rotating means for rotating each said first and second axles about their respective axis extending from said first end to said second end of each said axle such that in use said platform defines a ramp position when said first and second axles are rotated thereby rotating said first and second axle arms of each said axles such that each said axle is proximately positioned relative to the ground and said axle supporting frame is positioned at said second position and said platform defines a hauling position when said first and second axles are further rotated thereby rotating each said first and second axle arms of each of said axles such that each said axle is distally positioned relative to the ground and said axle supporting frame is positioned at said first position.

19. The tilting platform of claim 18 wherein said means for rotating said first axle and said second axle includes an interlinking means for rotationally interconnecting said first and second axles with said hydraulic ram to enable said axles to proportionally rotate when said hydraulic ram is activated.

20. A tilting mobile platform comprising:
   a platform for supporting and carrying articles positioned thereon and having a first end, a second end, a third end and a fourth end;
   a first and a second rail member with each of said rail members positioned between said first end and said second end of said platform with said first rail member being spaced apart relative to said second rail member in a parallel manner and each said rail members being securely fastened to said platform;
   an axle supporting frame slidably attached to said first and said second rail members and having a first side and a second side with said first side being slidably secured to said first rail member and said second side being slidably secured to said second rail member such that said axle supporting frame slides between said third end and said fourth end of said platform;
   a first axle, a second axle and a third axle with each axle having a first end and a second end and with each said first end of each said axle being rotatably attached to said first side of said axle supporting frame and each said second end of each said first axle being rotatably attached to said second side of said axle supporting frame such that each said axle is transversely mounted on said axle supporting frame relative to a path of movement of said axle supporting frame along said rail members;
   an axle supporting frame moving means for moving said axle supporting frame along said first and said second rail members from a first position wherein said axle supporting frame is positioned between said third end and said fourth end of said platform to a second position wherein said axle supporting frame is positioned proximate said third end of said platform and from said second position wherein said axle supporting frame is positioned proximate said third end of said platform to said first position wherein said axle supporting frame is positioned between said third end and said fourth end of said platform;

a first and a second axle arm with each said axle arm having a first end and a second end with said first end of each first and second axle arms being securely attached to each said first and second ends of said first, second and third axles such that each said axle arm extends perpendicularly relative to an axis extending through said respective axle;

each said second end of each said first and said second axle arms further includes a first and a second stud secured thereat and extending perpendicularly relative to an axis extending through said respective axle arm and parallel relative to said axis extending through said respective axle;

a first and a second ground engaging wheel rotatably attached to each of said first and said second studs of said first axle respectively for movably supporting said platform and the articles placed thereon;

a third and a fourth ground engaging wheel rotatably attached to each of said first and said second studs of said second axle respectively for movably supporting said platform and the articles placed thereon;

a fifth and a sixth ground engaging wheel rotatably attached to each of said first and said second studs of said third axle respectively for movably supporting said platform and the articles placed thereon;

said platform including a tow bar positioned proximate said third end of said platform to enable said platform to be moved along said ground; and an axle rotating means for rotating each said first, second and third axles about their respective axis extending from said first end to said second end of each said axle such that in use said platform defines a ramp position when said first, second and third axles are rotated thereby rotating said first and second axle arms of each said axles such that each said axle is proximately positioned relative to the ground and said axle supporting frame is positioned at said second position and said platform defines a hauling position when said first, second and third axles are further rotated thereby rotating each said first and second axle arms of each of said axles such that each said axle is distally positioned relative to the ground and said axle supporting frame is positioned at said first position.

21. The tilting platform of claim 20 further comprising a hydraulic ram and wherein said means for rotating said first, second and third axles includes an interlinking means for rotationally interconnecting said first, second and third axles with said hydraulic ram to enable said axles to proportionally rotate when said hydraulic ram is activated.

22. A front wheel drive motor vehicle comprising:
a platform for supporting and carrying articles positioned thereon and having a first end, a second end, a third end and a fourth end;
a first and a second rail member with each of said rail members positioned between said first end and said second end of said platform with said first rail member being spaced apart relative to said second rail member in a parallel manner and each said rail members being securely fastened to said platform;
each said first and said second rail members having a front end and a rear end;
a first front axle and a second front axle;
said first axle and said second axle supportably positioned proximate each said front end of each said first and second rail members respectively;
a motive means connected to each said first axle and said second axle to enable said platform to be moved along the ground by rotatably driving each said first front wheel and said second front wheel;
an axle supporting frame having a first side and a second side with said first side being slidably secured to said first rail member and said second side being slidably secured to said second rail member such that said axle supporting frame slides between said third end and said fourth end of said platform;
a first axle having a first end and a second end with said first end of said axle being rotatably attached to said first side of said axle supporting frame and said second end of said first axle being rotatably attached to said second side of said axle supporting frame such that said axle is transversely mounted on said axle supporting frame relative to a path of movement of said axle supporting frame along said rail members;
an axle supporting frame moving means for moving said axle supporting frame along said first and said second rail members from a first position wherein said axle supporting frame is positioned between said third end and said fourth end of said platform to a second position wherein said axle supporting frame is positioned proximate said third end of said platform and from said second position wherein said axle supporting frame is positioned proximate said third end of said platform to said first position wherein said axle supporting frame is positioned between said third end and said fourth end of said platform;
a first axle arm and a second axle arm with each said axle arm having a first end and a second end with said first end of each first and second axle arms being securely attached to each said first and second ends of said axle such that each said axle arm extends perpendicularly relative to an axis extending through said axle;
a first stud and a second stud secured at each said second end of said first and said second axle arms such that each said stud extends perpendicularly relative to an axis extending through said axle arm and parallel relative to said axis extending through said axle;
a first and a second ground engaging wheel rotatably attached to each of said first and said second studs respectively for movably supporting said platform and the articles placed thereon;
a first front and a second front ground engaging wheel rotatably secured to each said first front axle and said second front axle for movably supporting said platform and the articles placed thereon and for enabling said front end of each said first and said second rail members to pivot about said first and said second front axles thereby permitting said rear portion of each said first and said second rail members to be raised and lowered relative to said front end of each said first and said second rail members; and an axle rotating means to rotate said first axle about an axis extending from said first end to said second end of said first axle such that in use said platform defines a ramp position when said axle is rotated thereby rotating said first and second axle arms such that said first axle is proximately positioned relative to the ground and said axle supporting frame is positioned at said second position and said platform defines a hauling position when said first axle is further rotated thereby rotating said first and second axle arms such that said first axle is distally positioned relative to the ground and said axle supporting frame is positioned at said first position.

23. A tilting mobile platform comprising:

a platform for supporting and carrying articles positioned thereon and having a first side, a second side, a first end and a second end;

an axle supporting frame having a first side and a second side with said first side being slidably secured to said platform first side and said second side being slidably secured to said second platform side such that said axle supporting frame slides between said first end and said second end of said platform;

a first axle having a first end and a second end with said first end of said axle being rotatably attached to said first side of said axle supporting frame and said second end of said first axle being rotatably attached to said second side of said axle supporting frame such that said axle is transversely mounted on said axle supporting frame relative to a path of movement of said axle supporting frame along said platform sides;

an axle supporting frame moving means for moving said axle supporting frame back and forth along said first and said platform sides between a first position wherein said axle supporting frame is positioned between said platform first end and said platform second end and a second position wherein said axle supporting frame is positioned proximate said platform first end;

first and second ground engaging wheels; and means attached to said first and second axle ends for connecting said first and second ground engaging wheels respectively to said first and second axle ends, said attaching means including means for changing the distance between said platform and a center point of said ground engaging wheels.

24. The tilting mobile platform of claim 23 wherein said axle supporting frame moving means includes means for enabling said distance changing means so that said platform is moved from a first position to a second position, said second position bringing said platform closer to said center point of said ground engaging wheels before said wheels are moved from said first position.

25. The tilting mobile platform of claim 24 wherein said enabling means is a hydraulic ram and wherein said axle distance changing means includes first and second axle arms connected to one end of said ram and also connected respectively to said first and second axle ends for rotating said first and second axle arms around said first and second axle ends.

26. The tilting mobile platform of claim 24 wherein said frame moving means is arranged to control said back and forth movement of said axle frame such that said platform is parallel to the ground when both said axle frame and said distance changing means are in their respective first positions and such that said second end of said platform is proximate the ground and forming an inclined ramp when said axle frame and said distance changing means are in their respective second positions.

27. The tilting mobile platform of claim 24 further comprising at least one other axle parallel to said first axle, said other axle controlled by said axle supporting frame such that said other axle moves from said first position to said second position concurrently with the movement of said first axle between said first and said second positions, and wherein said other axle is controlled by said distance changing means so as to change the distance between said platform and a center point of ground engaging wheels associated with said other axle.

28. The tilting mobile platform of claim 27 wherein the changed platform to wheel center distance between said first position and said second position is different for each axle.

* * * * *